United States Patent [19]

Lyons

[11] Patent Number: 4,817,658

[45] Date of Patent: Apr. 4, 1989

[54] AUTOMATIC VALVE ACTUATOR

[75] Inventor: Jerry L. Lyons, St. Louis, Mo.

[73] Assignee: Essex Industries, Inc., St. Louis, Mo.

[21] Appl. No.: 234,483

[22] Filed: Aug. 19, 1988

[51] Int. Cl.[4] .............................................. F16K 5/08
[52] U.S. Cl. ...................................... 137/75; 251/67; 251/313
[58] Field of Search ...................... 137/75; 251/66, 67, 251/68, 74, 107, 109, 313

[56] References Cited

U.S. PATENT DOCUMENTS

| 1,897,000 | 2/1933 | Biery | 251/68 |
| 3,538,929 | 11/1970 | Bothin | 251/067 X |
| 4,275,754 | 6/1981 | Lyons . | |
| 4,503,717 | 3/1985 | Keller et al. | 251/74 X |
| 4,533,114 | 8/1985 | Cory et al. | 251/74 X |

Primary Examiner—A. Michael Chambers
Assistant Examiner—John C. Fox
Attorney, Agent, or Firm—Kalish & Gilster

[57] ABSTRACT

A valve actuator (A, B) for automatic actuation of a rotary valve mechanism (V, V') in response to a specific exigency, such as fire. The actuator includes a housing (13) affixed in relation to the valve, having a spiral torsion spring (11, 11'). A spring coupling (20) is connected to the spring for being rotatably driven for actuation thereby of the valve mechanism (41, 61) when released. An arm (6) having a camming surface (32') operatively prevents rotation of the coupling until released. A releasable link (L) secures the arm against releasing movement. The coupling is operatively connected to a shaft (40) of the valve mechanism and mating elements (26, 27) carried by the coupling and the housing respectively lockingly interengage the coupling and housing upon actuation such that the valve mechanism is precluded from rotating in a direction contrary to the actuation direction upon actuation.

9 Claims, 3 Drawing Sheets

FIG. 1
FIG. 2
FIG. 3
FIG. 4
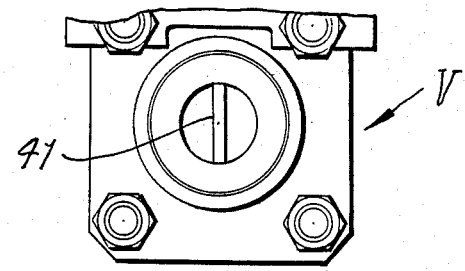
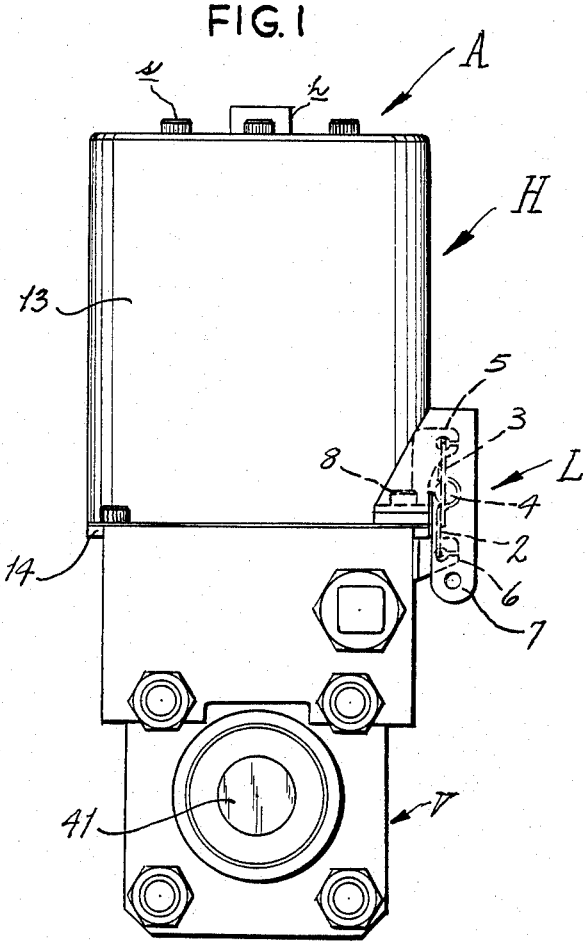
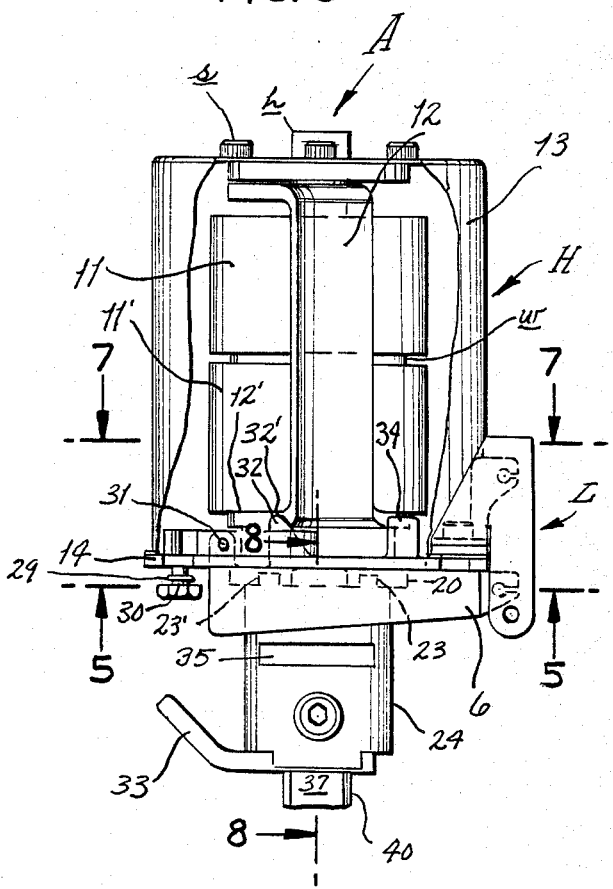
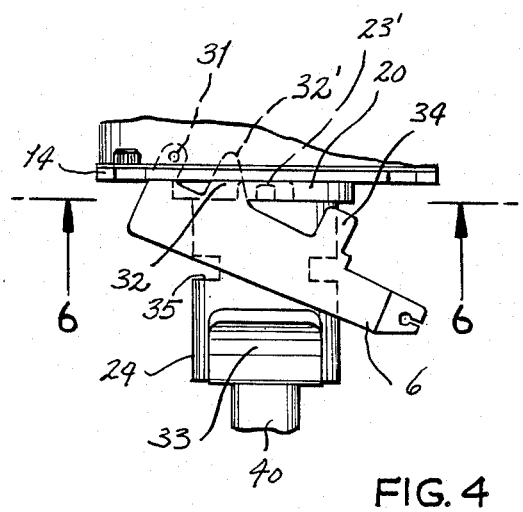

FIG. 5
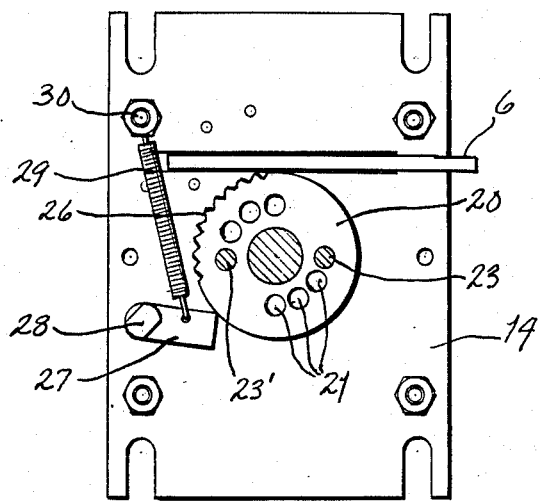
FIG. 6
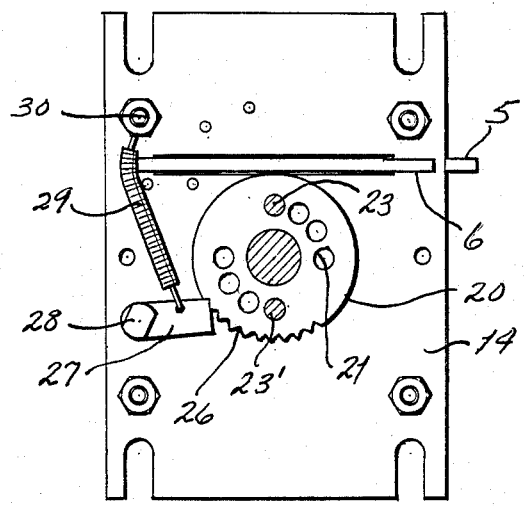
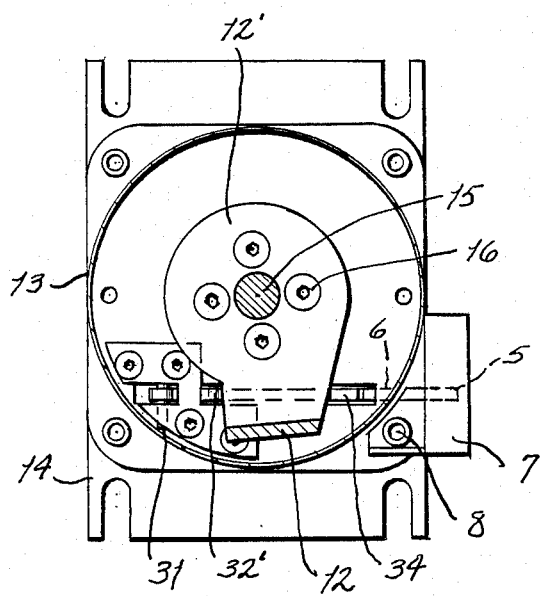
FIG. 7
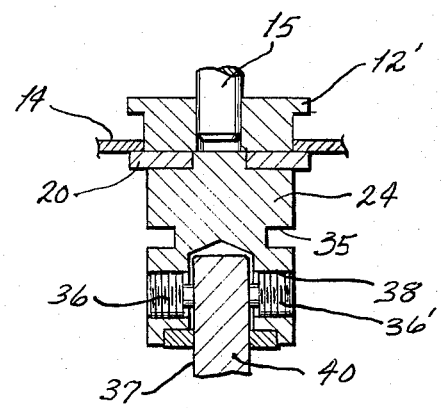
FIG. 8

AUTOMATIC VALVE ACTUATOR

BACKGROUND OF THE INVENTION

This invention relates to valve actuators, and in particular to an automatic valve actuator for actuation of a rotary valve, especially a rotary butterfly valve, in response to a particular occurrence of a character such that immediate automatic opening or closing of the valve is desired.

It has been known to provide automatic valve actuators for causing immediate actuation of a valve in an emergency. Such valve actuators, as, for example, taught by this applicant in Lyons U.S. Pat. No. 4,275,754, are especially suited for ball valves which, when closed, are securely shut off and, when open, are securely open to passage. Such actuators, however, are not especially suited for use in connection with butterfly valves, which have a tendency to change relative position within a flowpath when fluid pressure is applied, as these actuators are devoid of a means of securely locking the valve in its actuated position. Such actuators also do not include means for ensuring that a valve is absolutely maintained in its fully closed position upon actuation, if, for example, such is its actuated position.

Other automatic valve actuators are incapable of effectively providing means for securely presetting the valve in a position other than fully open or fully closed. This disadvantage has prevented the pre-setting of butterfly valves in, for example, a half-open, flow rate-controlling position. It has, therefore, been necessary to employ two valve mechanisms: one for controlling flow rate and one for providing emergency actuation.

SUMMARY OF THE INVENTION

It is an object of this invention to provide an automatic valve actuator which is amenable to actuation by a variety of fusible links, including but not limited to heat-sensitive, smoke-sensitive, electronically actuated and operator-triggered devices.

It is another object of this invention to provide an automatic valve actuator which can be set to be actuated into an open or closed position, depending on the circumstances of the particular application.

It is yet another object of this invention to provide a compact valve actuator which allows for pre-setting the valve mechanism into a flow rate-controlling position, such pre-setting being lockingly secure so as to ensure that the valve retains its positional integrity in the presence of industrial flow rates.

A still further object of this invention is the provision of an automatic valve actuator wherein there is provided a means of securing the valve lockingly in its actuated position, thereby precluding rotation of the valve in a direction contrary to the actuation direction.

Briefly, this invention provides an automatic valve actuator for rotatably actuating a valve. The actuator includes a housing, means for affixing the housing in relation to the valve, a spring within the housing, and a coupling connected to the spring for being rotatably driven for actuation thereby of the valve mechanism when released. Camming means operatively prevents rotation of the coupling until released, there being a releasable link for securing the camming means against releasing movement. The coupling is operatively connected to a shaft of the valve mechanism. Mating elements are carried by the coupling and the housing plate respectively for lockingly interengaging the coupling and housing upon actuation such that the valve mechanism is precluded from rotating in a direction contrary to the actuation direction upon actuation.

Still further objects of this invention and its features will be apparent from the following drawings and description.

BRIEF DESCRIPTION OF THE DRAWINGS

FIG. 1 is an end elevation view of the valve actuator of the present invention in combination with a conventional butterfly valve, as configured in accordance with and embodying the present invention.

FIG. 2 is a fragmentary view of the conventional valve mechanism in the fully open position.

FIG. 3 is an end elevation cutaway view of the present invention in a pre-set condition prior to actuation.

FIG. 4 is a fragmentary view of the camming means portion of the valve actuator in an actuated condition.

FIG. 5 is a horizontal cross section taken along line 5—5 of FIG. 3 showing the actuator in a pre-set condition.

FIG. 6 is a horizontal cross section taken along line 5—5 of FIG. 3 showing the actuator in an actuated condition.

FIG. 7 is a horizontal cross section of the actuator taken along line 7—7 of FIG. 3.

FIG. 8 is a fragmentary vertical cross section of the actuator taken along line 8—8 of FIG. 3.

DESCRIPTION OF THE PREFERRED EMBODIMENT(S)

Figure 9:
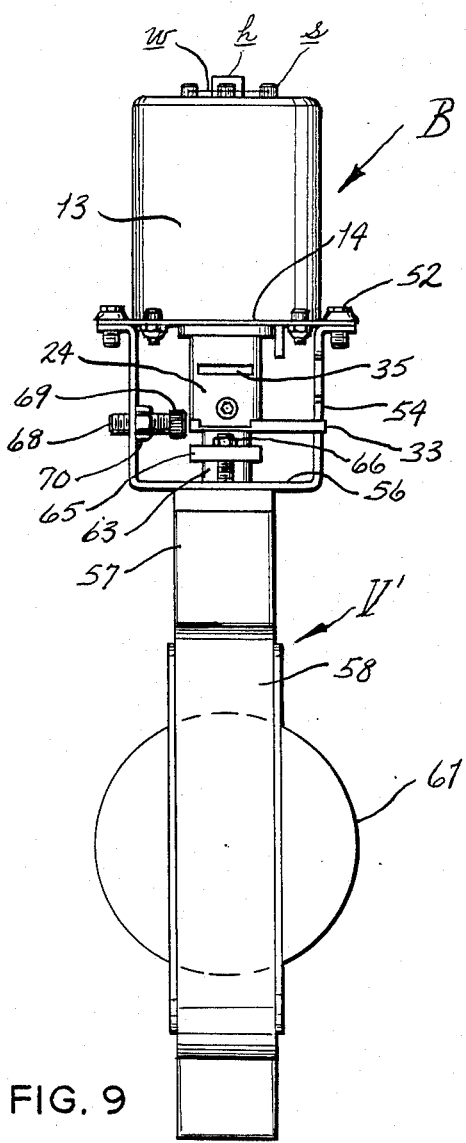
FIG. 9 is a side elevation view of another embodiment of a valve actuator of the present invention as configured for attachment to a different type of butterfly valve.

Referring now to FIGS. 1–8, a valve actuator is shown generally at A in combination with a valve assembly V. Valve V is shown as a conventional butterfly valve for illustration only, the actuator being especially suited for use with valves of this variety. However, the actuator is amenable for use with a variety of other rotary type valves.

Shown generally at L is a conventional fusible link assembly. The link is shown here as a pellet-type heat-sensitive link for illustration purposes only. The valve actuator is also amenable for use with other links, including, but not limited to, smoke-sensitive, electronically actuated and operator triggered devices.

Link assembly L as shown here and in more detail in Lyons U.S. Pat. No. 4,275,754 includes link elements 2 and 3 and a pellet 4. Link elements 2 and 3 are held by a link holder 5 and arm 6, respectively within a protective shroud 7, the entire assembly being fastened to a housing plate 14 by a screw 8.

Shown generally at H is a housing assembly including spiral torsion springs 11, 11', as separated by a washer w, spring arm 12, enclosure 13, housing plate 14 to which the enclosure is mounted, and shaft 15 which is urged by spring arm 12 in an actuation direction by the spring. Said housing assembly is disclosed in the above referenced patent, herein incorporated by reference. As evident therein, springs 11, 11' can be tightened by a spring anchor shaft head h and then maintained in tightened condition by screws s.

A coupling 20 is rotatably carried by housing plate 14 on said plate's lower face and interconnected with a base 12' of spring arm 12 by means of screws 16, so that the coupling can be driven in an actuating direction by spring arm 12. Coupling 20 includes counter bore pin depressions 21 for fittingly engaging pins 23 and 23' of a valve shaft engager 24. As by way of preferred example only, four radially opposite pairs of counterbore pin depressions 21 allow for optional relative angular prepositioning of corresponding pins 23 extending upwardly from shaft engager 24. This facilitates the optional positioning of the valve in four alternative flow rate-controlling positions within the fluid flowpath upon installation. Shaft engager 24 carries handle projection 33 which further facilitates prepositioning of the shaft engager. Said handle projection is also suitable for engaging a stop (not shown) to thereby restrict rotation of the shaft engager. The actuator assembly is therefore suitable for installing in combination with a valve in a fully open position, a less than fully open and thereby flow rate-controlling position, or in a fully closed position.

Coupling 20 carries teeth 26 which are suitably shaped for matingly engaging a pawl locking element 27, said pawl being pivotally fastened to housing plate 14 by means of screw 28. Housing plate 14 also carries a tension spring 29 which is attached to the housing plate by means of screw 30, the spring urging pawl 27 into engagement with the periphery of coupling 20.

Referring to FIGS. 4 and 7, arm 6 comprises a relatively thin strip lying in a vertical plane beneath plate 14 and hinged at one end for swinging in a vertical plane by a pin 31, all as described in said Lyons U.S. Pat. No. 4,275,754. Arm 6 exerts a camming action for preventing rotation of spring arm 12 responsive to the spring forces present when spring 11 is tightened. Arm 6 has a portion 32 extending upwardly through a slot in plate 14, and including a beveled portion 32' providing a cam face for engaging a corresponding face formed in the base of spring arm 12. The force of wound spring 11 tends to cause clockwise rotation of the spring arm, as viewed in FIG. 7, to cause a camming force to be exerted on extension 32 for tending to separate link portions 2, 3.

A further projection on tab 34, integral with the arm 6 is shown in pre-actuation positions in FIGS. 3 and 7, for interferingly preventing rotation of spring arm 12.

Pins 23 and 23', integral with shaft engager 24, interconnectingly extend from said shaft engager into counterbore pin depressions 21 of coupling 20, they facilitate rotation of said shaft engager in conjunction with said coupling upon actuation and establish arcuately adjustable relation therewith. That is, by prepositioning of pins 23, 23' in the desired depressions 21, the initial positioning of the valve shaft is predetermined. For manual initial positioning of shaft engager 24 for mating with coupling 20, wrench slots 35 are provided. It will be noted that shaft engager 24 includes threads 38 by which said shaft engager carries set screws 36 and 36'. Said set screws, contacting shaft flat 37 of valve shaft 40, interconnectingly provide for rotation of valve shaft 40 in conjunction with shaft engager 24 upon actuation.

Initiation of said actuation is accomplished by severance of link elements 2, 3, as caused, for example, by melting of pellet 4. This is accordingly followed by the release of camming surface 32' and the resultant movement of arm 6 permits actuation rotation of spring arm 12. Said rotation interconnectingly causes corresponding rotation of coupling 20, shaft engager 24, valve shaft 40 and butterfly configuration valve element 41.

FIG. 5 shows the coupling assembly in a typical locked condition, prior to actuation. FIG. 6 shows the coupling assembly after counterclockwise (as shown) rotation of the coupling upon actuation. Locking element 27 is matingly engaged with teeth 26, providing hatcheting, one-way relationship therewith and so preventing rotation contrary to the actuation direction of the coupling and butterfly valve interconnected with it. This locking mechanism securely maintains the valve and actuator in the as-actuated position as is critical in many applications.

As described, such actuation brings about closure of the valve, but it is readily understood that the actuator can be configured for actuation of the valve from closed, or partially closed, position to an open position as circumstances may dictate.

Figure 10:
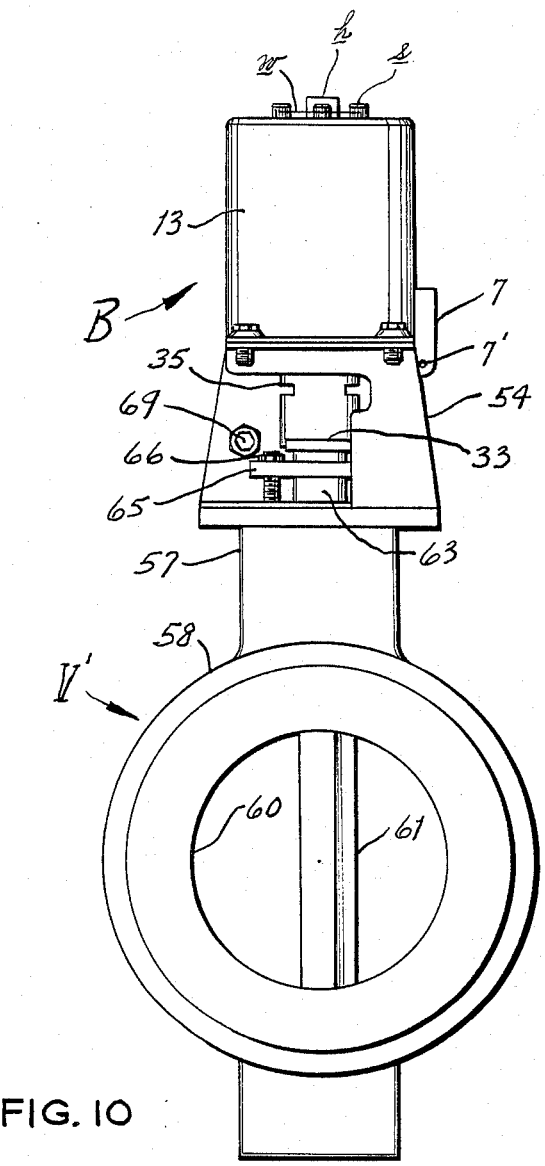
FIG. 10 is an end elevation view of the assembly of FIG. 9.
Figure 11:
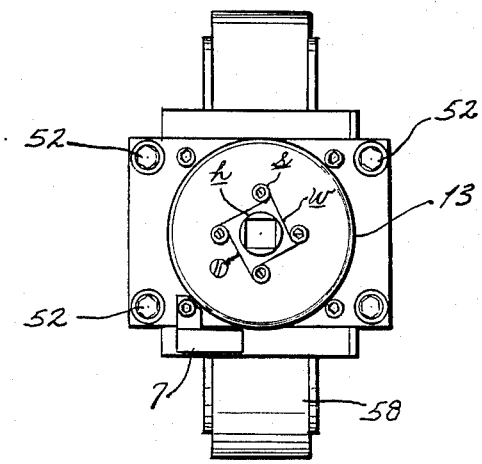
FIG. 11 is a top plan view thereof.

Referring to FIGS. 9–11, a version B of the invention shown interconnected with a relatively large type butterfly valve V'. For this purpose, housing 13 is seated upon plate 14 but the latter is secured as by bolts 52 to a bracket 54 of U-shaped configuration. Said bracket is secured at its lower portion 56 to an upwardly extending portion 57 of a body 58 of valve V'. Valve body 58 is of annular configuration and defines a seat 60 against which a valve disc 61 will close by rotation of the valve shaft to which the disc is secured as by being pinned. Consequently, actuator B is adapted to rotate disc 61 between its open position, as illustrated, and the closed position in sealing relationship with seat 60. Valve V' will further be seen to include an extension 63 extending upwardly from bracket portion 56 in which the valve shaft (not shown in FIGS. 9–11) is maintained in sealed relationship. A fitting 65 at the top of extension 63 may be tightened by means of a screw 66 in accordance with a commercially available version of the valve, for purposes of tightening the valve shaft packing.

In other respects, valve actuator B is like valve actuator A, and corresponding reference characters are used accordingly. It will, in addition, be noted the provision of a stop bolt 68 carrying a head 69 for being engaged by arm 33, and with the position of head 69 being adjusted by a lock nut 70. Safety provisions will be noted as including the use of safety wire w for securement of screws s and shroud 7 includes an aperture 7' for receiving a safety pin to prevent inadvertent actuation of the powerful actuator during assembly, disassembly or installation. Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. In a valve actuator for automatic actuation of a rotary valve mechanism having a shaft and a valve element carried by the shaft in response to a specific exigency, the actuator including a housing, means for affixing the housing in relation to the valve, a spring within the housing, a coupling connected to the spring for being rotatably driven for actuation thereby of the valve mechanism when released, camming means for operatively preventing rotation of the coupling until released, a releasable link for securing the camming means against releasing movement, the coupling being operatively connected to a shaft of the valve mechanism, the improvement comprising a mechanism for lockingly interengaging the coupling and housing upon actuation such that the valve mechanism is precluded from rotating in a direction contrary to the actuation direction upon actuation.

2. Apparatus according to claim 1 wherein said mechanism comprises mating elements respectively carried by the coupling and housing for permitting rotation of the valve mechanism only in the activation direction.

3. Apparatus according to claim 2 wherein the mating elements comprise a pawl pivotally fastened to a plate carrying, and forming part of, the housing, and teeth carried by the housing for ratcheting engagement by the pawl, and means resiliently urging the pawl into engagement with the teeth.

4. Apparatus according to claim 1 wherein the valve shaft carries a shaft engager affixed thereto for rotation of the shaft, and means interconnecting the shaft engager and coupling in arcuately adjustable relation for establishing thereby initial positioning of the valve shaft.

5. Apparatus according to claim 4 wherein the means interconnecting the shaft engager and coupling comprise a plurality of pins extending into counterbore pin depressions.

6. Apparatus according to claim 5 wherein there are at least a pair of pins carried by the shaft engager and the coupling includes a plurality of pairs of counterbore depressions for receiving corresponding ones of the pins for predetermined initial positioning of the shaft engager relative to the coupling.

7. Apparatus according to claim 1 wherein the valve element is of butterfly configuration.

8. Apparatus according to claim 7 wherein the actuating direction is in a sense for closing the valve element.

9. Apparatus according to claim 7 wherein the actuating direction is in a sense for opening the valve element.

* * * * *